United States Patent [19]

Bennett

[11] 4,056,999

[45] Nov. 8, 1977

[54] PIANO TEACHING AID

[76] Inventor: William J. Bennett, 23403 South Berendo, Torrance, Calif. 90502

[21] Appl. No.: 724,301

[22] Filed: Sept. 17, 1976

[51] Int. Cl.² ............................................. G09B 15/02
[52] U.S. Cl. ........................................ 84/479; 428/914
[58] Field of Search ................................. 84/470–485, 84/423; 428/914

[56] References Cited

U.S. PATENT DOCUMENTS

| 484,589 | 10/1892 | Hanke et al. | 84/476 |
|---|---|---|---|
| 1,114,139 | 10/1914 | Hoffmann | 84/476 |
| 1,724,904 | 8/1929 | Buxton | 84/471 |
| 1,758,043 | 5/1930 | Hoffmeister | 84/483 R |
| 2,221,143 | 11/1940 | Lang | 84/478 |

Primary Examiner—Lawrence R. Franklin

[57] ABSTRACT

A sequence of first, second and third overlay segments that are initially lightly adhered to the white keys of a replica of a piano keyboard defined on a backing strip. The first, second and third overlay segments are subsequently removed from the backing strip and adhered to the white keys of a piano keyboard. The first and second overlay segments when mounted on the white keys of a piano keyboard visually define a treble signature and a bass signature. Elongate tabs extend from the first and second overlay segments and visually indicate to a user the keys on the keyboard that correspond to notes on the lines of the upper and lower groups thereof on the music. The third overlay identifies the middle C key on the piano keyboard. Overlay segments in the form of sharps and flats are provided that are secured to appropriate white keys of the keyboard to visually indicate that they are to be sharped or flatted. Notes in spaces on the music between lines in the upper and lower groups are identified on the piano keyboard as being between an appropriate two of the tabs.

4 Claims, 5 Drawing Figures

U.S. Patent  Nov. 8, 1977  4,056,999
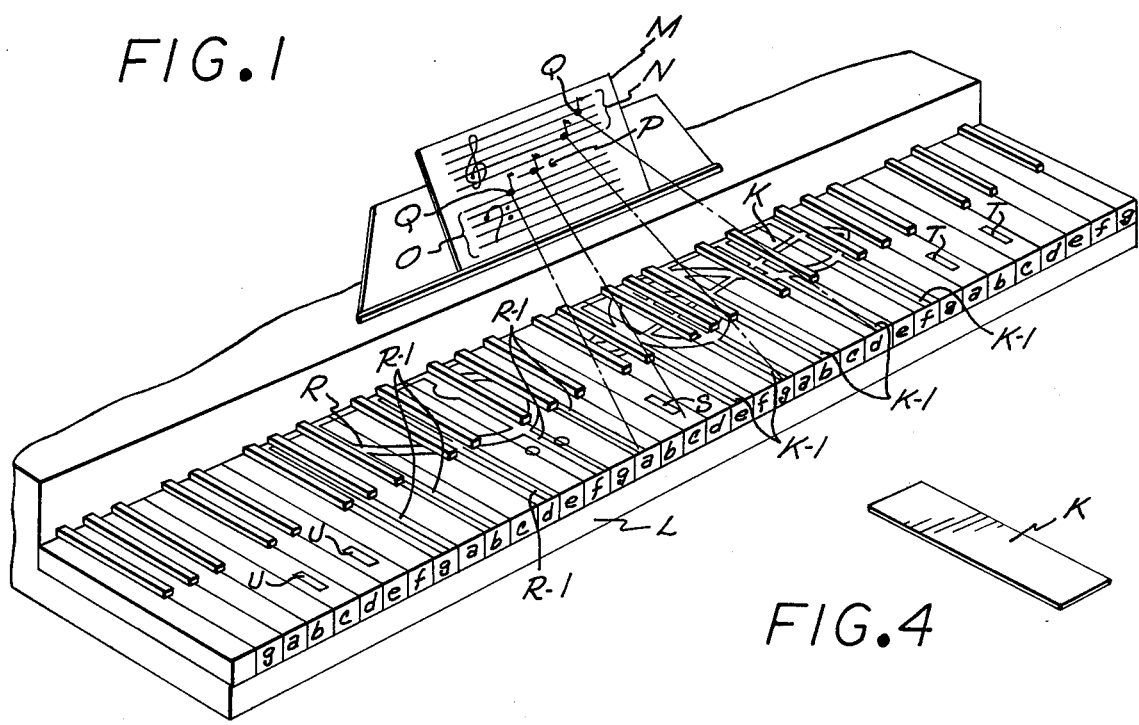
FIG.1
FIG.4
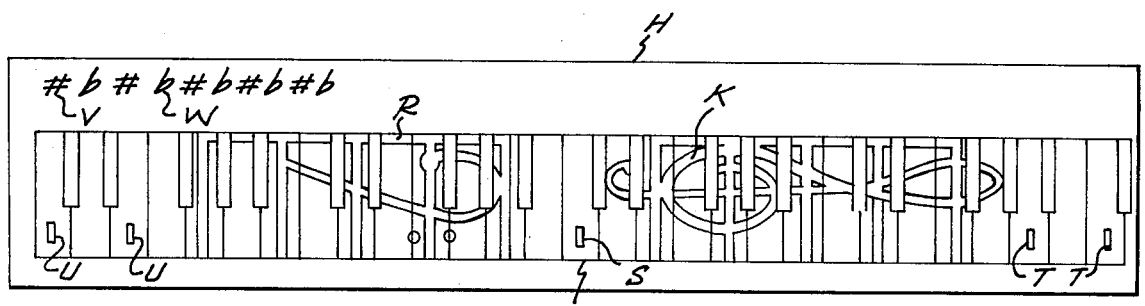
FIG.2
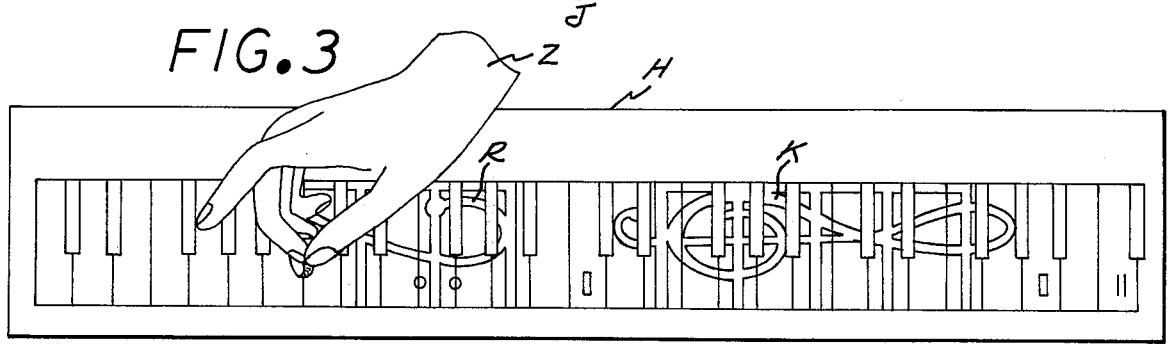
FIG.3
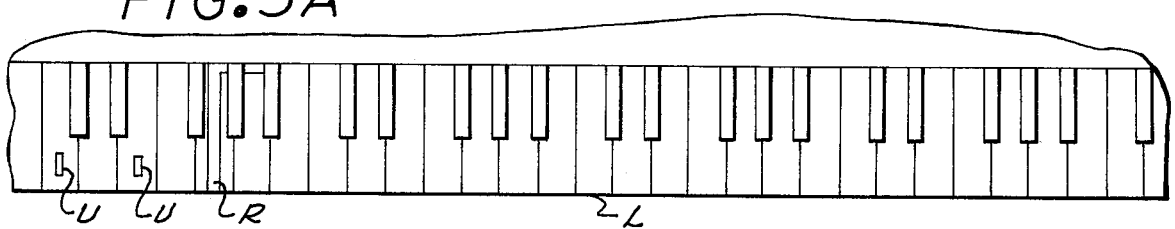
FIG.3A

PIANO TEACHING AID

BACKGROUND OF THE INVENTION

1. Field of the Invention
Piano Teaching Aid.
2. Description of the Prior Art

In the teaching of piano, one of the major obstacles for a beginning student is to visually associate a note on either the treble or bass lines of a sheet of music with the correct key on a piano keyboard, as well as to remember which white keys on the piano keyboard are to be sharped or flatted. Various devices have been proposed and used in the past to assist the student in overcoming the above mentioned obstacle. However, in the main such prior art piano teaching aids have been unduly complicated, are difficult to use and understand, and as a result have been of limited assistance to a beginning student.

A major object of the present invention is to provide a piano teaching aid that is simple and easy to use, is inexpensive, and one that will facilitate the student in acquiring the ability to sight read music.

SUMMARY OF THE INVENTION

First, second and third overlay segments that are initially removably secured to a backing strip on which a replica of the white and black keys of a piano keyboard are defined. The overlay segments are subsequently removed from the backing strip and removably secured to the white keys of a piano keyboard. The first overlay segments when so mounted on the white keys define a treble signature, and from which signature elongate tabs project to indicate to the user that the keys on which the tabs are mounted correspond to notes on the lines in the upper group of the latter on sheet music.

The second overlay segments when removably mounted on white keys of a piano keyboard define a bass signature from which elongate tabs project. The white keys identified by the elongate tabs indicate to a user that these keys correspond to notes on lines in the bass of the sheet music. The third overlay segment is removably mounted on middle C key of the piano keyboard, which corresponds to a note on the line between the treble and bass of sheet music. Notes in spaces between the lines in sheet music are easily identified by a user on a piano keyboard, by the user referring to the two tabs on the piano keyboard that are on opposite sides of the white keys. If desired, fourth overlay segments may be provided that are affixed to white keys on the piano keyboard above and below the treble and bass to indicate to a user the position of additional notes on the music. Fifth overlay segments in the form of sharps and flats are provided that may be removably secured to appropriate white keys on the piano keyboard to remind a user that these keys must be sharpened or flatted.

BRIEF DESCRIPTION OF THE DRAWING

FIG. 1 is a perspective view of a conventional piano keyboard with the invention removably mounted thereon, and phantom lines illustrating how the invention visually identifies the keys on the keyboard identified with notes on the treble and bass lines of a sheet of music;

FIG. 2 is a top plan view of the invention removably mounted on a backing strip;

FIG. 3 is a top plan view of the backing strip with the overlay segments being removed therefrom;

FIG. 3a is a top plan view of a piano keyboard with the overlay segments being sequentially applied thereto; and FIG. 4 is a perspective view of a typical overlay segment.

DESCRIPTION OF THE PREFERRED EMBODIMENT

The present invention includes an elongate backing strip H best seen in FIG. 3 that has a replica J of a portion of a conventional piano keyboard defined thereon. In the drawing the replica J is illustrated as including the octaves above and below middle C and portions of the octaves adjacent the upper and lower octaves.

A number of first overlay segments K are provided that are formed from a pliable sheet material that have first and second oppositely disposed surfaces 30 and 32. The first surfaces 30 are coated with a film of pressure sensitive adhesive 34 as shown in FIG. 4 and the second surfaces are of a color that contrasts to the black and white color of a piano keyboard.

The first overlay segments K are removably disposed on the replica J and define a treble signature thereon as shown in FIG. 2. A conventional key board L is shown in FIG. 1 that has a sheet of music M disposed adjacent thereto, which sheet has treble lines N, bass lines O and middle C line P, and notes Q on these lines, imprinted thereon.

The first overlay segments K are adhered to the white keys of the keyboard L as shown in FIG. 1 to correspond to the treble lines N, with the overlay segments on keys e, f, g, b, and d having forwardly extending tabs K-1 included as a part thereof that visually indicate to a user that the keys on which they are mounted correspond to the treble lines N. Thus, when a user sees a note Q on a line of the group of treble lines N he immediately relates it to the keys of the keyboard L on which the overlay segments K are mounted. The tabs K-1 identify the keys of the keyboard L with corresponding treble lines N and the user when he sees a note Q on a treble line N knows which key to strike.

When a note Q is in a space between two treble lines N on the sheet of music M, the user knows immediately that the key to strike on keyboard L is situated between two of the tabs K-1.

A second group of overlay segments R with tabs R-1 is provided, that is of the same structure as the first group K, but in the form of a bass signature that is applied to the white keys of the keyboard L as shown in FIG. 1. The overlay segments R serve the same function in identifying keys in the first octave below middle C on the keyboard L, as the first overlay segments K do on keys in the first octave above middle C.

Third, fourth and fifth groups of tabs S, T and U are provided that are removably secured to the middle C key of keyboard L, keys corresponding to lines of the treble above the group N, and keys corresponding to lines of the bass below the group O on music M.

In FIG. 3 a hand 2 is shown sequentially removing the overlay segments K, R, S, T and U from the backing strip H and in FIG. 3a a portion of the overlay segments is shown being applied to the keyboard L. The phantom lines in FIG. 1 illustrate the relationship between the sheet of music M and the invention when mounted on the keyboard L. Overlay segments V and W in the form of sharps and flats may be removably mounted on backing strip H and removed therefrom and applied to appropriate keys of keyboard L to remind a user that these keys must be sharped or flatted.

The use and operation of the invention has been explained previously in detail and need not be repeated.

I claim:

1. In combination with a piano that includes a keyboard defined by a plurality of side-by-side white keys and a plurality of black keys spaced in groups of two and three and a sheet of music that has a score thereon that includes an upper spaced group of parallel lines that are identified by a treble insignia and which lines and the spaces therebetween have a plurality of longitudinally spaced notes associated therewith; a lower spaced group of parallel lines that are identified by a bass insignia and which lines and the spaces therebetween have a plurality of longitudinally spaced notes associated therewith; and a single line that corresponds to middle C disposed between said upper and lower group of lines and separated therefrom by upper and lower spaces, said single line and upper and lower spaces having a plurality of spaced notes associated therewith, a device capable of being removably secured to said white keys to visually indicate to a user the white key that corresponds to a particular note on upper group of lines and said spaces therebetween, said lower group of lines and said spaces therebetween, and said single line and spaces above and below the latter, said device including:
   a. an elongate backing strip on which a replica of at least the portion of the white and black keys of said keyboard are depicted that correspond to said notes on said score of said sheet of music;
   b. a plurality of first overlay segments disposed side-by-side on said white keys of said replica to define a treble signature, said first overlay segments that correspond to lines on said first group including straight tabs, said first overlay segments having first and second oppositely disposed surfaces, and said first surfaces being of a color that visually distinguishes said first overlay segments from said black and white keys;
   c. first means on said second surfaces that removably secure said first overlay segments to said backing strip and to the white keys of said piano keyboard that correspond to said replicas after said first overlay segments are removed from said backing strip;
   d. a plurality of second overlay segments disposed side-by-side on said white keys of said replica that are of the same structure as said first overlay segments but are different in shape in that they define a bass signature, said second overlay segments being mounted on said backing sheet and secured to the corresponding white keys of said keyboard in the same manner as said first overlay segments;
   e. a third overlay segment in the form of an elongate tab that is of the same structure as one of said first overlay segments that is removably mounted on middle C key of said replica and when removed therefrom is removably secured to middle key C of said keyboard, with said first, second and third replicas when mounted on said white keys of said keyboard visually indicating to a user the key that corresponds to a note on a line of said upper and lower groups of lines and the line therebetween, and notes in spaces in said upper and lower groups of lines and above and below the middle C line in said music being identified on said piano keyboard as a white key disposed between two of said tabs.

2. A device as defined in claim 1 in which said first means is a film of pressure sensitive adhesive that coats said second surfaces of said first, second and third overlays, and lightly adheres said overlays to said backing strip.

3. A device as defined in claim 1 which in addition includes:
   f. a plurality of fourth overlay segments in the form of elongate tabs that are of the same structure as said first overlay segments that are mounted on said white keys of said replica above and below said first and second groups of lines and when mounted on said white keys visually identify white keys that correspond to notes on lines of said music above and below said upper and lower groups of lines.

4. A device as defined in claim 1 which in addition includes:
   f. a plurality of fourth overlay segments in the forms of sharps and flats that are of the same structure as said first overlay segments that are removably mounted on said elongate strip and removed therefrom as needed to be applied to appropriate white keys of said piano keyboard to visually indicate that particular white keys on said keyboard are to be sharped or flatted.

* * * * *